June 1, 1937. V. TANASSO ET AL 2,082,084
NOSE PAD COUPLING MEANS FOR EYEGLASS FRAMES
Filed Feb. 25, 1936
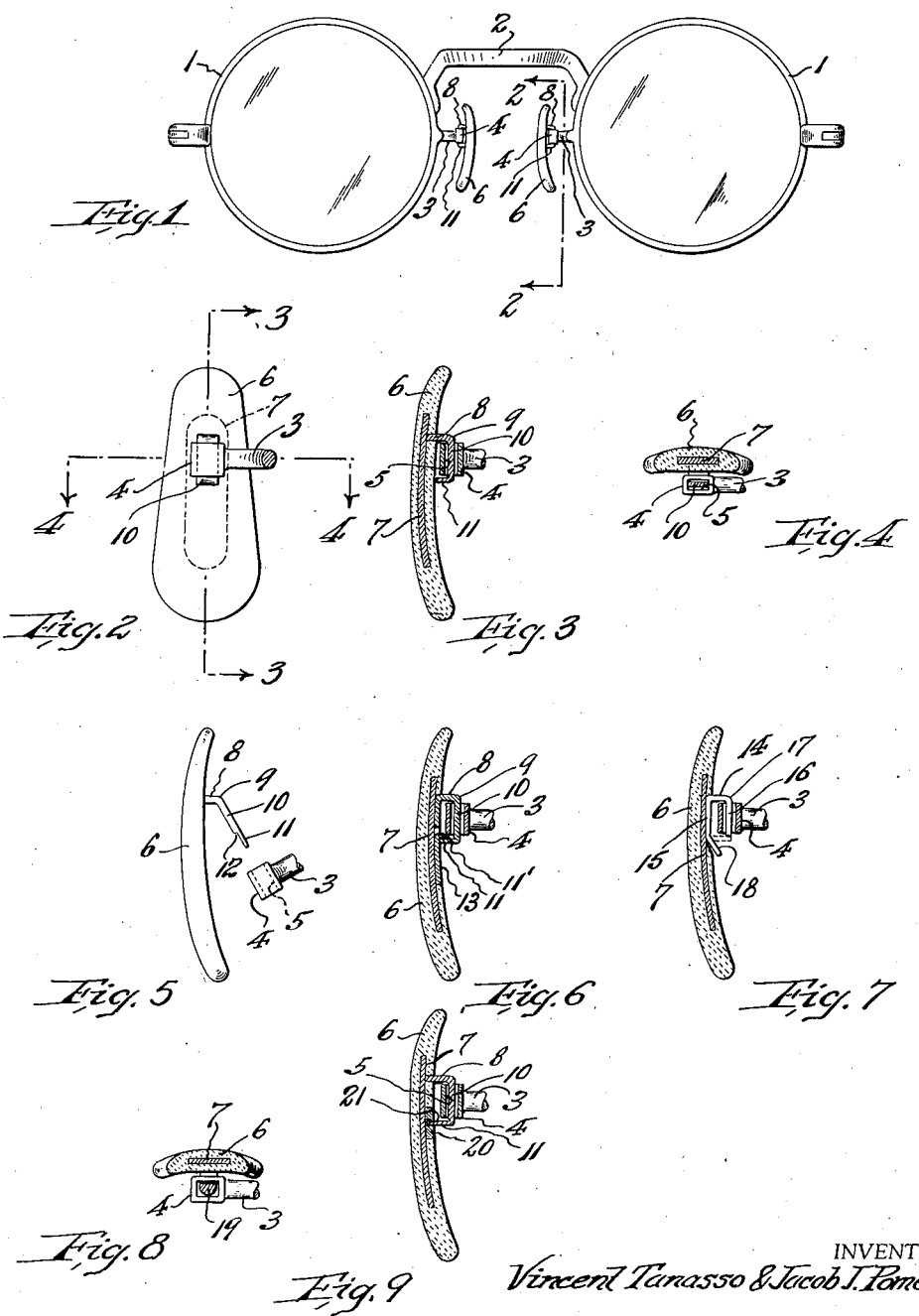
INVENTOR.
Vincent Tanasso & Jacob T. Pomeranz,
BY
George D. Richards
ATTORNEY.

Patented June 1, 1937

2,082,084

UNITED STATES PATENT OFFICE 2,082,084

NOSE PAD COUPLING MEANS FOR EYEGLASS FRAMES

Vincent Tanasso, Harrison, and Jacob J. Pomeranz, Brooklyn, N. Y.

Application February 25, 1936, Serial No. 65,566

3 Claims. (Cl. 88—49)

This invention relates to improvements in means for mounting nose pads in connection with eyeglass frames.

This invention has for its principal object to provide a novel means for coupling nose pads to the arms provided in connection with eyeglass frames for the support thereof; the novel coupling means being of such character that the nose pads may be quickly and easily connected or disconnected from their supporting arms by very simple manipulations which may be readily performed by the retail optician, without necessity for the use of special tools, and consequently repairs and replacements may be quickly and efficiently made by the retail optician.

The invention has for a further object to provide an easily manipulatable coupling means between the nose pads and their supporting arms which, when in service, will permit self-adjusting movements of the pads relative to the nose of the wearer of the eyeglasses; such adjustments being of relative large amplitude in vertical planes with but a minimum of lateral play or looseness, so that the pads will efficiently and firmly contact, throughout their face areas, with the wearer's nose and consequently, in use, will assure both comfort to the wearer and stability of the eyeglasses in proper position upon the wearer's head and relative to the wearer's eyes.

Other objects of this invention, not at this time more particularly enumerated, will be understood from the following detailed description of the same.

Illustrative embodiments of this invention are shown in the accompanying drawing, in which:

Fig. 1 is a front elevation of an eyeglass frame or front equipped with the novel nose pad coupling means according to this invention; Fig. 2 is a detail sectional view, taken on line 2—2 in Fig. 1, but drawn on an enlarged scale; Fig. 3 a longitudinal section, taken on line 3—3 in Fig. 2; Fig. 4 is a transverse or horizontal section, taken on line 4—4 in Fig. 2; and Fig. 5 is a side edge elevation showing the arrangement and relation of the pad coupling elements preparatory to assembly or disassembly thereof.

Fig. 6 is a longitudinal sectional view, showing a somewhat modified form of pad coupling means; Fig. 7 is a similar view, showing another modified form of pad coupling means; Fig. 8 is a transverse or horizontal section, similar to that of Fig. 4, but showing certain further modification of the pad coupling means; and Fig. 9 is a longitudinal sectional view, showing another modified form of the pad coupling means.

Similar characters of reference are employed in the above described views, to indicate corresponding parts.

Referring to the drawing, the reference character 1 indicates rims of an eyeglass frame or front by which the lenses are supported. The rims 1 are spaced apart and operatively interconnected by a bridge or center piece 2. Affixed to the inner sides of rims 1, below bridge or center piece 2, are the nose guard or pad supporting arms 3; the same usually being bent or doubled into a more or less goose-neck formations, the free end portions of which may be moved relative to the rims 1 so as to suitably adjust the spaced apart relation of nose pads, which, in use, are coupled thereto.

The novel nose pad coupling means according to this invention comprises, in part, an open-ended or tubular vertically extending coupler box 4 fixed on the free extremity of each supporting arm; the open-ended interior of said coupler box 4 providing a vertically disposed through passage 5, which is of rectangular cross-sectional shape.

The nose pad comprises a suitably shaped body 6, which, in preferred form, is made of pyroxylin or other suitable material moulded around or otherwise secured and related to a reenforcing metallic plate 7. Secured to said plate 7, as by solder, or otherwise suitably formed and joined to spring therefrom, is a coupler strap comprising a fixed leg 8 projecting horizontally outward from the back of the pad, to the end of which is connected, by a bendable elbow section 9, an angularly extending journal portion 10 adapted for longitudinal extension in outwardly offset relation to said pad back, said journal portion 10 terminating in a bendable keeper tongue 11, which is preferably of reduced thickness so as to provide, at the point of jointure with said journal portion 10, a transverse bending score 12. The coupler strap thus formed, corresponds in width to the width of the passage 5 of the coupler box 4, although the thickness of said coupler strap is somewhat less in dimension than the internal dimension of said coupler box passage 5 at right angles to the width of the latter, so that when coupler strap and coupler box are assembled in mutually interengaged relation, a certain amount of play is allowed for whereby the pad may rock longitudinally, i. e. from end to end, while lateral looseness or side to side rocking or wobbling is reduced to a minimum.

Preparatory to assembling a pad 6 in connected or coupled relation to a supporting arm 3, the journal portion 10 of its couplet strap is bent from the elbow section 9 to an outwardly inclined or oblique relation to the rear face plane of pad 6, with the keeper tongue 11 extended in the plane of said journal portion 10 (see Fig. 5). With the coupler strap thus arranged, the same may be easily and quickly inserted downwardly through the passage 5 of coupler box 4, whereupon said journal portion 10 is bent inwardly from the elbow section 9 into a normal or operative vertical plane parallel to the rear face plane of pad 6, following which the keeper tongue 11 is bent or turned inwardly from its bending score 12 into right angle extension from the end of said journal portion across the lower end of coupler box 4 and toward the back of pad 6; the free end of said keeper tongue when thus turned or bent being footed or abutted against the back face of said pad 6 (see Fig. 3 more especially). Upon completion of these operations the pad 6 will be operatively coupled with the supporting arm 3, and said pad 6 will be free to rock longitudinally sufficiently to assure self-adjustment of the pad in an angular plane conforming to that of the surface of the wearer's nose, when brought in contact with the latter. Owing to the close fit between the side margins of the coupler strap journal portion 10 and the side walls of the coupler box 4 contiguous thereto, lateral looseness of the coupling connection and consequent undue side to side wobbling of the pad relative to its support is adequately guarded against.

It will be obvious that the above described pad assembing operations, due to the extreme simplicity of the novel coupling connection, may be easily performed by the retail optician without necessity for employment of special tools and merely by aid of suitable pliers. As a consequence of this the retail optician may quickly and easily remove and replace nose pads upon eyeglass frames or fronts for purposes of repair, etc.; and, furthermore, because of the ease of manipulation, the optician may keep in stock a variety of pad styles, materials and shapes for interchangeable application to eyeglass frames according to the requirements and tastes of his customers.

In Fig. 6 there is shown a somewhat modified coupler strap structure, wherein the fixed leg 8 is arranged to spring from a foot plate 13, which, because of its extent and area, may be soldered or brazed to the reenforcing plate 7 with stronger anchorage, and may also be imbedded in the material of the pad 6 so as to be flush with the back face thereof, if desired. In this view is also shown a stop stud or lug 11' which is projected from the back face of the pad, and against which the keeper tongue 11 may be abutted, when bent across the lower end of the coupling box 4, thereby preventing said keeper tongue from being bent too far, with risk of binding the coupler box 4 so as to obstruct its desired free longitudinal rocking movement.

In Fig. 7 there is shown another modified form of coupler strap structure, wherein the fixed leg 14 springs from one end of a base or foot plate 15, the journal portion 16 being connected with the outer end of said fixed leg by the bendable elbow section 17. Connected with the other end of said base or foot plate 15, and bendable relative thereto, is a keeper tongue 18. In assembling this form of coupler connection, said keeper tongue 18 is bent down and away from the free end of the journal portion 16, so as to expose the same subject to the sliding of coupler box 4 thereon. After the coupler box 4 is engaged on said journal portion 16, said keeper tongue 18 is bent upwardly across the lower end of the coupler box and into abutment with the free extremity of said journal portion 16, as shown by dotted lines in Fig. 7.

In Fig. 8 the coupler strap 19 is shown as made of half-round stock instead of flat stock as shown in the other above described forms thereof.

In Fig. 9 we have shown a further modified construction of the coupling means, which includes the same features as illustrated more especially in Fig. 3, but in addition thereto there is affixed to the plate 7 an interlock piece 20, which projects toward the back of the nose pad, with its outer surface preferably flush with the latter. This interlock piece 21 is provided with a transverse slot or indentation 21 adapted to receive the extremity of the keeper tongue 11, when the latter is bent across the lower end of the coupler box 4, thus interlocking the keeper tongue 11 against accidental displacement while at the same time preventing the same from being bent too far, with risk of binding the coupler box 4 so as to obstruct its desired free longitudinal rocking movement. It will be understood that the interlock piece 20 and its slot 21 is but one specific illustration of means serving the above described purposes thereof, and is, of course, subject to more or less variation in detail form and arrangement to the end that, essentially, a means is provided to receive and interengage with the extremity of the keeper tongue 11.

It will be understood that changes, other than those hereinabove mentioned, could be made in the above described constructions, and many apparently widely different embodiments of this invention could be made without departing from the scope thereof as defined in the appended claims. It is therefore intended that all matter contained in the above description or shown in the accompanying drawing shall be interpreted as illustrative and not in a limiting sense.

We claim:—

1. A nose pad coupling means for eyeglass frames, comprising an arm affixed to a lens rim of the frame, a coupler box affixed to the extremity of said arm, said coupler box having a vertical through passage of rectangular cross-sectional shape, a nose pad, a coupler strap means projecting from the back of said pad, said coupler strap means comprising a leg affixed to and projecting horizontally from the back of said pad, a journal portion to extend through said coupler box passage, a bendable elbow connecting said journal portion with the extremity of said leg, and a keeper tongue integral with and extending from the free end of said journal portion, the juncture of said keeper tongue and journal portion having a bending score, said keeper tongue being removably engageable across an end of said coupler box to retain the same against displacement from said coupler strap journal portion.

2. A nose pad coupling means for eyeglass frames, comprising an arm affixed to a lens rim of the frame, a coupler box at the arm extremity, said coupler box having a vertical through passage of rectangular cross-section, a nose-pad, a coupler strap having a horizontally projecting leg portion affixed by its inner end to said nose-pad back, a journal portion extending from the free end of said leg portion through said coupler box passage, a bendable keeper tongue extending from the free end of said journal portion, said keeper tongue being removably engageable across an end of said coupler box to retain the same against displacement from said coupler strap journal portion, and a stop projection horizontally projecting from said nose-pad back against which said keeper tongue abuts when disposed across said coupler box end.

3. A nose pad coupling means for eyeglass frames, comprising an arm affixed to a lens rim of the frame, a coupler box at the arm extremity, said coupler box having vertical through passage of rectangular cross-section, a nose-pad, a coupler strap having a horizontally projecting leg portion affixed by its inner end to said nose-pad back, a journal portion extending from the free end of said leg portion through said coupler box passage, a bendable keeper tongue extending from the free end of said journal portion, said keeper tongue being removably engageable across an end of said coupler box to retain the same against displacement from said coupler strap journal portion, and means at the back of said nose-pad including a recess to receive the extremity of said keeper tongue when the latter is bent across the coupler box end to thereby prevent accidental displacement thereof.

VINCENT TANASSO.
JACOB J. POMERANZ.